UNITED STATES PATENT OFFICE.

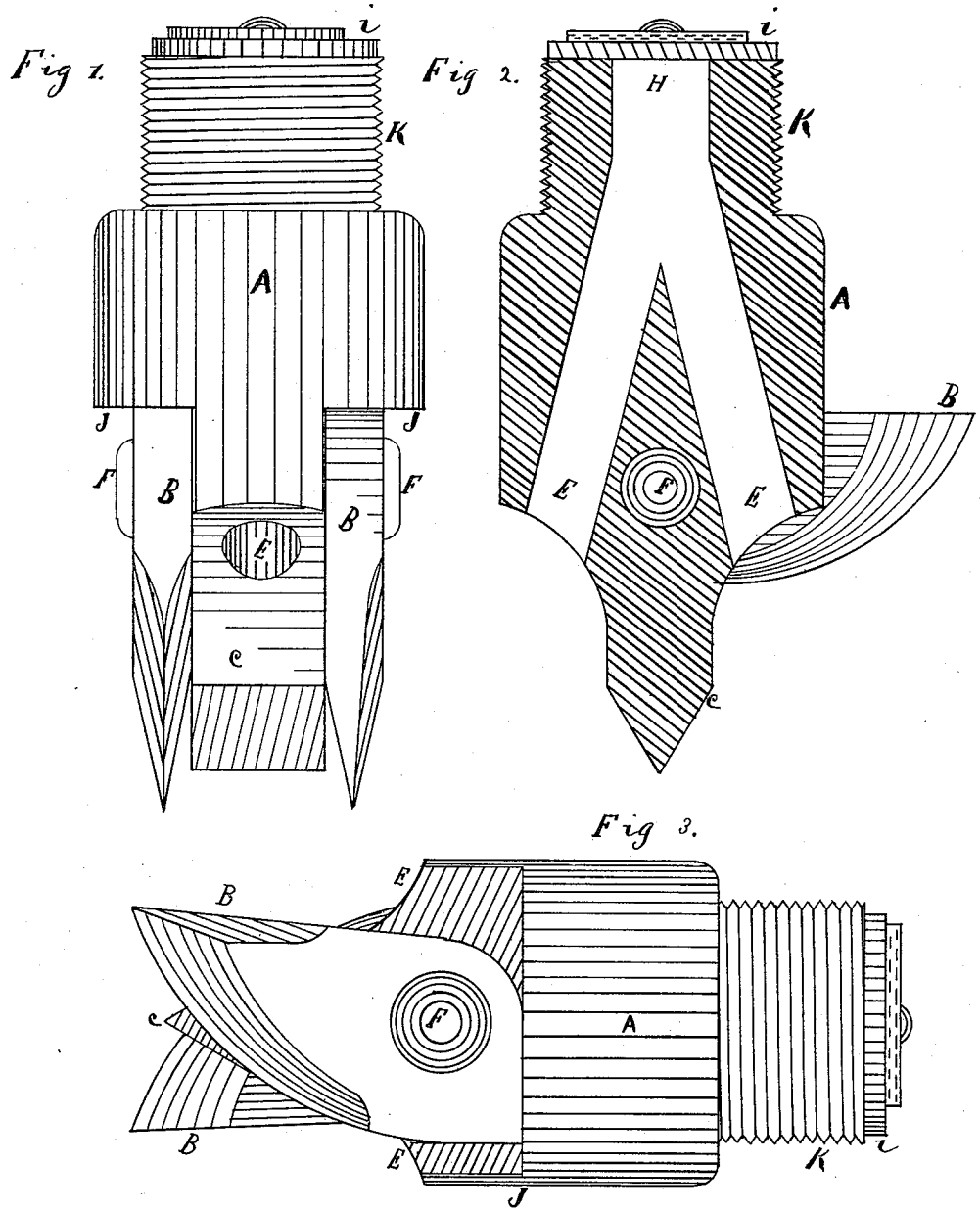

WILLET C. WELLS, OF TIFFIN, OHIO.

SELF PUMPING AND EXPANDING WELL-DRILL.

SPECIFICATION forming part of Letters Patent No. 332,683, dated December 15, 1885.

Application filed April 9, 1885. Serial No. 161,755. (No model.)

*To all whom it may concern:*

Be it known that I, WILLET C. WELLS, a citizen of the United States, residing at Tiffin, in the county of Seneca and State of Ohio, have invented a new and useful Improvement in Self Pumping and Expanding Well-Drills.

My invention relates to improvements in reciprocating drills, which enlarge their bore by means of wings, of which the following is a specification.

The object of my improvement is to provide a suitable opening or openings in a winged expanding drill, said openings leading to the hollow drill stock, whereby the detritus is pumped to the surface and discharged where desired.

Figure 1 is a side view showing the drill A recessed to receive the wings B B. The fixed or central bit, C, is cut away to allow the opening E to come inside the radius of the drill. Fig. 2 shows one-half of Fig. 1 cut at right angles with the pin F, that holds the wing B to the drill, and shows the central part of bit C cut away; also, the branch openings E E, the vertical opening H, valve I, and wing B expanded. Fig. 3 is a side view showing the wings B B closed within the diameter of the drill, the pin F, shoulder J, and central bit, C, cut away for the openings E E, the screw-threaded shank K, and valve I.

I do not claim as new, wings for enlarging the bore, as that was patented in 1863 by Loomis G. Marshall, No. 40,176 and No. 48,819; nor do I claim as new a drill with openings that will discharge the detritus at the surface, as that was patented in 1857 by Jesse N. Boles, No. 17,064; neither do I claim as new the combination of a winged drill having an opening or openings above the wings, as this is anticipated in the patent of T. P. Thompson, April 30, 1878, No. 203,217.

My invention more particularly relates to a winged drill with the fixed or central bit cut away in such a manner that the opening or openings may come within and beneath the periphery of the drill and beneath the wings in such a manner that the openings are not obstructed by the wings, whether the wings are closed or open.

I do not confine myself to any particular number of wings, nor to any particular number of openings.

The cutting away of the central or fixed bit may be accomplished by a curve, or by a straight face at any angle with the axial line of the drill.

I am aware that drills of a somewhat similar combination have been made; but those drills have had their openings above the wings and shoulders of the drills, and in some cases the mouths of said openings are placed in the vertical sides of the drill-head, and so arranged that as the drill descends the detritus is forced out by the wings and shoulders of the drill, and as the drill drops the water in its upward course rushes past the openings in the vertical sides of the drill-head, its momentum being so great that it is carried past said openings with such force that it is impossible for it to turn the abrupt angle necessary for it to enter the said openings.

As my drill is constructed, I gain every possible advantage in an easy passage of the detritus up through the openings and into the drill-stock, the lower part of the body or fixed cutting portion of the bit being cut away, so as to allow the openings to come below and within the vertical sides and shoulders of the drill, the openings being between the winged cutters, and not obstructed thereby. The almost vertical direction taken by the water in its passage through the drill when the drill falls, the upward motion of the water in the drill-stock when it is quickly raised, and the downward rush of the water outside the drill-stock all tend to make the escape of the detritus through the openings under the drill easier when the drill drops than to pass up through the downward column outside and around the drill.

Having thus described my invention, what I claim, and desire to secure by Letters Patent, is—

1. A winged expanding well-drill having fixed drill-head with opposite faces converging to form a central cutting-edge transverse to the face or faces to which the wing or wings are pivoted, and openings (one or more) in said converging faces extending upward and communicating with the interior of the tubular drill-stock, substantially as described.

2. An expanding well-drill having fixed and central drill-head with faces converging to form a cutting-edge, one or more openings extending upward from the converging faces of said fixed drill-head and communicating with the interior of the tubular drill-stock, and expanding wings (one or more) pivoted to the side or sides of said fixed drill-head and oscillating thereon in a plane transverse to the cutting-edge of the fixed head, substantially as described.

In testimony that I claim the foregoing as my own I have hereunto affixed my signature in presence of two witnesses.

WILLET C. WELLS.

Witnesses:
 RUSH ABBOTT,
 GEO. D. LOOMIS.